US005927725A

United States Patent [19]

Tabata et al.

[11] Patent Number: 5,927,725

[45] Date of Patent: Jul. 27, 1999

[54] SEALING DEVICE FOR A CAVITY OF A WATERPROOF CONNECTOR HOUSING

[75] Inventors: Masaaki Tabata; Shigekazu Wakata, both of Yokkaichi, Japan

[73] Assignee: Sumitomo Wiring Systems, Ltd., Japan

[21] Appl. No.: 08/923,787

[22] Filed: Sep. 4, 1997

Related U.S. Application Data

[62] Division of application No. 08/421,547, Apr. 13, 1995, abandoned.

[30] Foreign Application Priority Data

Apr. 13, 1994 [JP] Japan .................................... 6-100803
Apr. 18, 1994 [JP] Japan .................................... 6-104870

[51] Int. Cl.$^{6}$ ....................................................... F16J 15/10

[52] U.S. Cl. .......................... 277/607; 277/624; 277/626; 174/152 G; 439/587

[58] Field of Search .................................... 277/603, 606, 277/607, 615, 616, 619, 624, 626, 627; 174/65 R, 65 SS, 65 G, 152 G, 153 G, 151; 439/553, 556, 559, 587, 589; 16/2.1, 2.2; 138/89

[56] References Cited

U.S. PATENT DOCUMENTS

| | | | |
|---|---|---|---|
| 3,462,728 | 8/1969 | Elliot | 439/556 |
| 3,601,771 | 8/1971 | Dozier | 439/553 |
| 4,329,540 | 5/1982 | Howarth . | |
| 4,415,166 | 11/1983 | Beia | 277/166 |
| 4,643,506 | 2/1987 | Kobler | 439/587 |
| 4,656,689 | 4/1987 | Dennis | 174/153 G |
| 4,692,562 | 9/1987 | Nattel . | |
| 4,797,122 | 1/1989 | Kuboi et al. | 439/589 |
| 4,895,533 | 1/1990 | Yagi et al. . | |
| 4,966,374 | 10/1990 | Oikawa et al. | 174/153 G |
| 5,059,747 | 10/1991 | Bawa et al. . | |
| 5,087,795 | 2/1992 | Guginsky . | |
| 5,224,875 | 7/1993 | Watanabe et al. | 439/587 |
| 5,227,139 | 7/1993 | Wong . | |
| 5,278,352 | 1/1994 | Schade . | |
| 5,278,357 | 1/1994 | Yamanashi . | |
| 5,295,865 | 3/1994 | Endo et al. | 439/587 |
| 5,352,126 | 10/1994 | Kuboshima et al. | 439/587 |
| 5,395,266 | 3/1995 | Abe et al. | 439/587 |
| 5,454,737 | 10/1995 | Saba | 439/559 |
| 5,596,176 | 1/1997 | Everitt . | |

FOREIGN PATENT DOCUMENTS 5198228 8/1993 Japan .

*Primary Examiner*—Anthony Knight
*Assistant Examiner*—John L. Beres
*Attorney, Agent, or Firm*—Jordan B. Bierman; Bierman, Muserlian and Lucas

[57] ABSTRACT

A sealing device for a cavity into which a wire is inserted, the sealing device including an elastic sealing member which sealingly engages the inner surface of the cavity and the outer surface of the wire so as to prevent entrance of water into the cavity, and a rigid retainer associated with the sealing member and engaging the cavity so that, when the wire is bent transversely, deformation of the sealing member is substantially prevented and the integrity of the seal is maintained. This sealing device reliably prevents entrance of water, even if water is sprayed thereon at high pressure.

11 Claims, 9 Drawing Sheets

SEALING DEVICE FOR A CAVITY OF A WATERPROOF CONNECTOR HOUSING

This application is a Division of application Ser. No. 08/421,547, filed Apr. 13, 1995, now abandoned.

This Application claims the benefit of the priority of Japanese Applications 6/100803 and 6/104870, filed Apr. 13, 1994 and Apr. 18, 1994, respectively.

The present Invention relates to a sealing device, particularly for a connector, which prevents entrance of water into a cavity for accommodating a terminal fitting, as well as a method for assembling it.

BACKGROUND OF THE INVENTION

A known sealing device for a connector is shown in FIG. 15. It prevents entrance of water into cavity 97 which accommodates terminal fitting 96. This structure employs a cylindrical sealing member 90 of rubber. First, wire 95 is inserted into center hole 91 of member 90. Terminal fitting 96 is then cramped around wire 95, and sealing member 90 is moved to a position adjacent terminal fitting 96. Member 90 is pressed into cavity 97 at the same time terminal fitting 96 is inserted.

When fitted in cavity 97, sealing member 90 is radially compressed, resulting in deformation of projections 92 which are formed on the outer surface of sealing member 90 and extend circumferentially thereof. Deformed projections 92 come into sealing contact with the inner surface of cavity 97. Projection 93, which is circumferentially located on the surface of center hole 91, is also deformed, and comes into sealing contact with the outer surface of wire 95. In this way, water is prevented from entering cavity 97, where terminal fitting 96 is mounted, through clearances between the outer surface of sealing member 90 and the inner surface of cavity 97 or between the inner surface of sealing member 90 and the outer surface of wire 95.

However, when a transverse force acts on wire 95 extending out of cavity 97 through center hole 91, sealing member 90 undergoes radical elastic deformation as shown in FIG. 16. As a result, a gap is formed between the inner surface of cavity 97 and projections 92 on the outer surface of sealing member 90. In such a case, water can enter cavity 97 through this gap.

Another known sealing device mountable in a connector is shown in FIG. 17. Connector 101 includes cylindrical terminal fitting cavity 103 which accommodates terminal fitting 102. Fitting 102 comprises insulation barrel 102*a* for cramping on an insulated part of wire 104 and wire barrel 102*b* for cramping on the conductive core of wire 104 which is exposed by peeling off its insulation. Member 105 is substantially cylindrical and a plurality of flange-like ribs 105*a,* having a diameter larger than the inside diameter of cavity 103, are formed on the outer surface thereof. At one end of member 105, there is tube portion 105*b,* having a smaller diameter than ribs 105*a,* which can be cramped by insulation barrel 102*a*.

In use, wire 104 is first inserted into member 105 so that tube portion 105*b* faces the leading end of wire 104. The insulation on the leading end is peeled off to expose the core, which is then cramped by wire barrel 102*b* of terminal fitting 102. At the same time, the insulated part of wire 104 and tube portion 105*b* of the member 105 are cramped by insulation barrel 102*a*. The thus mounted members are inserted into cavity 103 of connector 101 with terminal fitting 102 leading. When member 105 is inserted, ribs 105*a* are deformed radially inwardly by the inner wall of cavity 103, since the diameter of ribs 105*a* is larger than the inside diameter thereof. As a result, member 105 comes into sealing contact with the inner wall of cavity 103, preventing water from entering.

In recent years, high pressure car washing machines have come into common use; they spray water on the vehicle at high pressure, not only on the vehicle body, but also into the engine compartment where the foregoing connector is often used. In such a case, the prior art seal (e.g. member 105) is subjected to water sprayed directly where ribs 105*a* are in contact with the inner wall of cavity 103. Thus, the high pressure spray may deform ribs 105*a* axially and thus radially inwardly of cavity 103, and cause a gap between ribs 105*a* and the inner wall of cavity 103 to form. Such a clearance permits entrance of water which is, of course, undesirable.

SUMMARY OF THE INVENTION

It is an object of the present Invention to provide a sealing device with improved sealing performance, particularly if high pressure water is sprayed thereon and/or when a force acts on the wire in a transverse direction. Another object of the Invention is to facilitate the assembly of the sealing device. The Invention will be described with relation to a wire harness as used—in particular—in an automotive vehicle. However, it is understood that it is useful in sealing cavities generally.

The sealing device comprises an elastic sealing member in combination with a rigid member, thus achieving an excellent seal even if the device is subjected to high pressure water and/or the application of transverse forces acting on the wire. Preferably, the rigid member is a retainer which is formed with a hole through which the wire passes from the rear of the device, and is inserted into the cavity.

DETAILED DESCRIPTION OF THE INVENTION

When a transverse force acts on the wire, the wire presses against the inner surface of the axial bore in the member, thereby also radially pressing the retainer. However, the retainer does not move because it is of rigid material and is held by the cavity. Accordingly, the position of the wire at the axial bore does not change and the wire is not radially displaced. Thus, the wire inward of the retainer exerts no pressing force against the sealing member in the transverse direction, so that there is no elastic deformation thereof. Hence, the sealing member is maintained in sealed contact with the outer surface of the wire and with the inner surface of the cavity, thereby reliably preventing entrance of water from outside into the cavity.

Preferably, the outer surface of the retainer facing outside the cavity is formed into an umbrella-like tapered surface. Water impinging on this surface flows radially toward the outer periphery, following the inclination of the tapered surface, thereby preventing water from remaining on the rear surface of the retainer.

It is further preferred that the retainer be unitarily coupled to the sealing member. Since the retainer and member are coupled in advance during the assembling, they can be mounted in the cavity at the same time. Thus, this sealing device is easier to assemble than those which are assembled by mounting the retainer and the sealing member in the cavity in separate stages.

In a second embodiment of the Invention, the sealing member comprises a base portion to be inserted into the cavity and a sealing flange externally sealing the cavity opening. The sealing flange laps over the edge of the cavity so as to prevent a jet of water from striking the seal between the base portion and the inner surface of the cavity directly. On the contrary, water sprayed in that direction impinges on the sealing flange and presses it against the rim of the cavity opening, thereby pressuring it into tighter contact therewith. Preferably, the flange constitutes a wall facing the rear of the cavity and is formed integrally with the base portion.

In a modification of the foregoing form of the Invention, a plate-like ring member is mounted axially rearwardly of the sealing flange and urges the sealing flange against the rim of the cavity opening. The sealing flange is of elastic material and of such size that it can externally seal the opening of the wire inserting portion of the cavity. The plate-like ring member is mounted axially rearwardly of the sealing flange so as to tightly sandwich it between the ring and the rim of the cavity. Accordingly, externally sprayed high pressure strikes ring member, which is thereby pressed against the sealing flange, thus forcing the sealing flange more tightly against the rim of the cavity. Thus, the Invention provides a sealing member capable of reliably preventing inward leakage even if high pressure water is sprayed thereupon.

Both the base portion and the sealing flange are integrally formed of elastic material. Accordingly, the inventive sealing member can be mounted in the same manner as prior art sealing members. Since the sealing flange is integral with the base portion, the sealing member can be easily fabricated.

The ring member may be formed into a cover which is mounted on the device to seal the cavity opening. The cover is mounted after the wire coupled with the sealing member is inserted. Thus, the cover is mounted to the rear of the sealing flange and retains the sealing member.

In another modification of the Invention, the sealing device comprises a sleeve extension projecting rearwardly of the sealing member and the ring member is mounted on the sleeve extension so that the entrance of water between the sealing member and the wire is prevented. Preferably, the device is constructed such that the sleeve extension projects from a wall constituted by the sealing flange. In this case, the ring member is mounted on the sleeve extension so that it prevents water from entering the cavity between the sleeve extension and the wire, and presses the sealing flange against the rim of the cavity opening, thus preventing water from entering through the gap between the base portion of the sealing member and the inner surface of the cavity.

In a particularly advantageous form of the device, the base portion and the sealing flange are connected by a thin portion defining a hollow between the sealing member and the wire and/or the sealing member and the inner surface of the cavity. Thus, a force seeking to bend the wire in a transverse direction is absorbed by the flexing of the thin wall and is not transmitted to the base portion.

The device of the present Invention is easily assembled. The sealing member and the rigid member are coupled, then the wire is inserted from the rear through the axial bore of the sealing member and the central bore of the rigid retainer. Finally, the terminal end of the wire and the coupled structure of the sealing member and the rigid member are inserted into the cavity of the device so that the retainer faces the rear of the cavity.

In the accompanying drawings, constituting a part hereof, and in which like reference characters indicate like parts:

Figure 1:
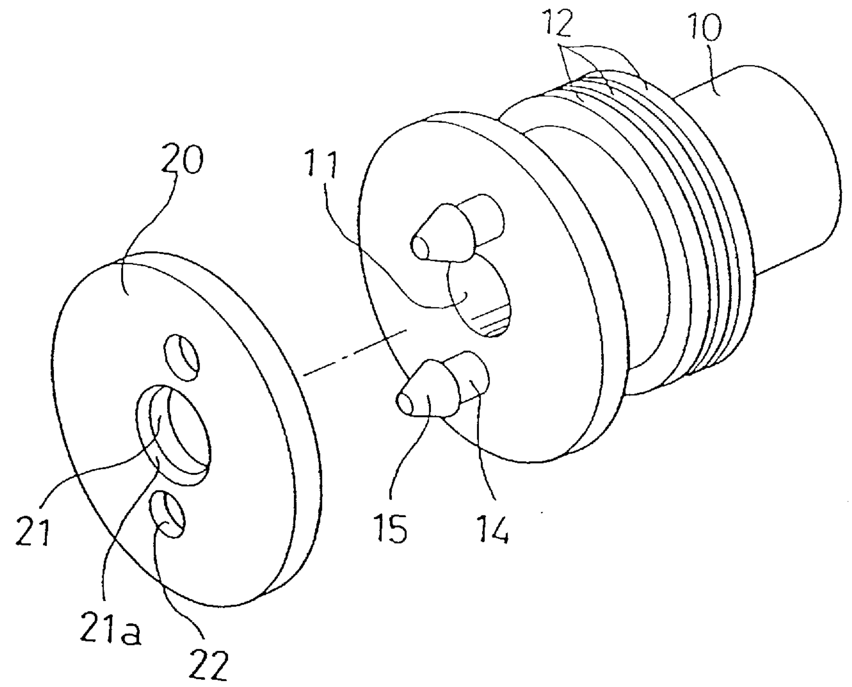
FIG. 1 is a perspective view of a sealing member and a separated retainer.
Figure 2:
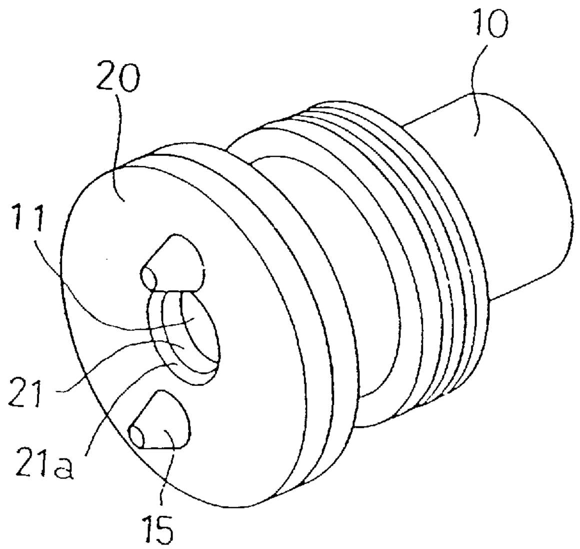
FIG. 2 is a view, similar to FIG. 1, wherein the member and the retainer are coupled.
Figure 3:
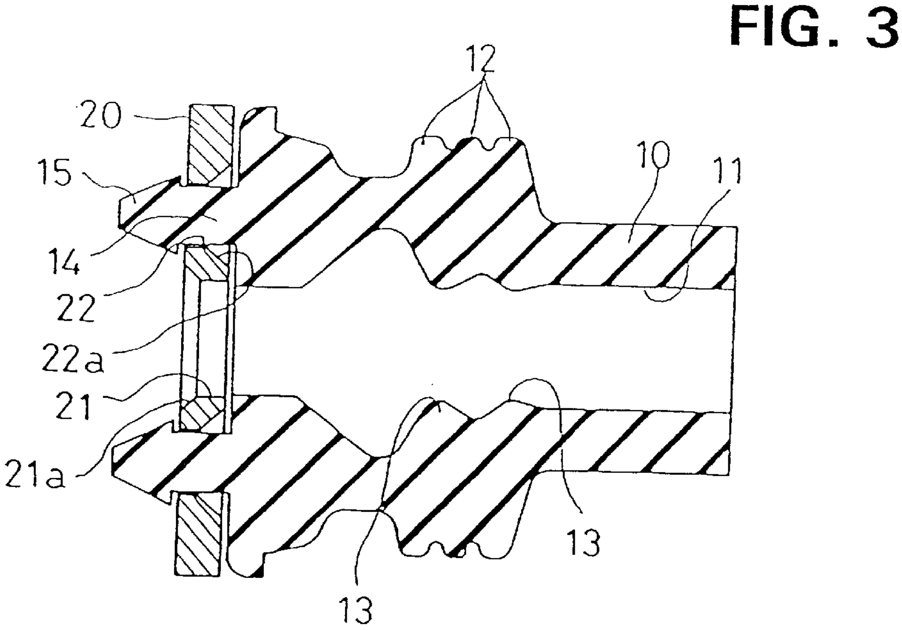
FIG. 3 is a sectional view of the assembled member and retainer.
Figure 4:
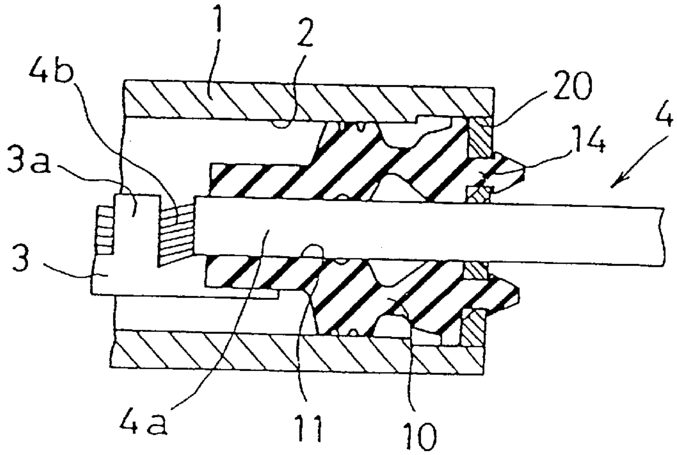
FIG. 4 is a section of the member and retainer mounted on a wire in a cavity.
Figure 5:
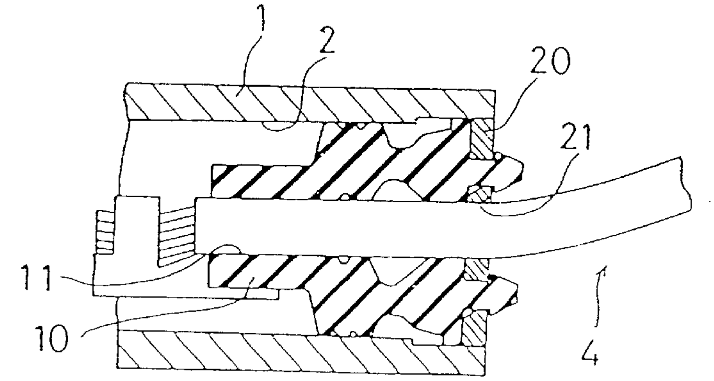
FIG. 5 is a section similar to that of FIG. 4 showing the effect of a force acting on the wire in a transverse direction.

As shown in FIGS. 1 to 5, connector housing 1 has cavity 2 with a circular cross-section which extends from a rear end of housing 1 to an unillustrated front end thereof. Terminal fitting 3 is inserted from the rear end into cavity 2 and locked in its desired position by an unillustrated locking means. Core 4*b*, exposed by peeling off insulation 4*a* at the leading end of insulated wire 4, is cramped with wire barrel 3*a* at the rear end of terminal fitting 3. The leading end of wire 4 is then inserted into cavity 2.

Substantially cylindrical sealing member 10 of elastically deformable material such as rubber is mounted on the leading end of wire 4 by inserting wire 4 into axial bore 11 in sealing member 10. Member 10 is mounted at the rear of cavity 2 together with terminal fitting 3 and wire 4. When member 10 is mounted in cavity 2, projections 12, on the outer surface of member 10 and extending in the circumferential direction thereof, undergo elastic deformation; they come into sealing contact with the inner surface of cavity 2 due to their elastic restoring force. At the same time, projections 13 on the surface of axial bore 11 and extending in the circumferential direction thereof also undergo elastic deformation and come into sealing contact with the outer surface of insulation 4*a* of wire 4.

Sealing member 10 is integrally formed with two engaging projections 14, 14 on its rear face, i.e. the face facing rearward from cavity 2. Engaging projections 14, 14 are on opposite sides of axial bore 11. At the projecting (rear) end of each engaging projection 14, there is locking portion 15 which projects radially outward, thereby forming a stepped portion, and whose diameter tapers toward the rear, thus forming tapered surface 15*a*.

Retainer 20 is also mounted in cavity 2. Retainer 20 is of synthetic resin or other material which is unlikely to be deformed and is in the form of a circular plate. The thickness of retainer 20 corresponds to the distance between the rear end face of member 10 and the stepped portion of locking portions 15. The outside diameter thereof is equal to the inside diameter of the rear end of cavity 2. Retainer 20 is formed with central bore 21 coaxial with axial bore 11 of sealing member 10. At the rear opening periphery of central bore 21 is tapered surface 21*a* whose diameter tapers toward the inner surface of retainer 20. Further, on the opposite side of central bore 21, are engaging holes 22 corresponding to engaging projections 14. The diameter of engaging holes 22 corresponds to that of engaging projections 14. At an inner (front) periphery opening of each engaging hole 22, there is formed tapered surface 22*a* whose diameter tapers in the rearward direction.

The sealing device is assembled by positioning engaging portions 14 opposite holes 22. Locking portions 15 are pressed into and through engaging holes 22 so as to couple sealing member 10 to retainer 20. During insertion, locking portions 15 undergo elastic deformation such that the diameters thereof decrease. Due to corresponding tapered surfaces 15*a* and 22*a,* insertion is easy. When emerging from engaging holes 22, locking portions 15 regain their original shape, thereby engaging projections 14 with engaging holes 22. In this way, retainer 20 is coupled to sealing member 10.

The leading end of wire 4 is inserted through axial bore 11 and central bore 21 of sealing member 10 and retainer 20 which have been unitarily coupled. Then, wire barrel 3*a* is cramped around core 4*b* of wire 4. Thereafter, member 10 and retainer 20 are pressed toward terminal fitting 3 to a predetermined position. In this way, member 10, retainer 20, terminal fitting 3, and the leading end of wire 4 are made integral with one another.

These integral members, terminal fitting 3 leading, are forced into cavity 2 against friction acting between the outer surface of sealing member 10 and the inner surface of cavity 2, until retainer 20 is mounted at the rear end of cavity 2. The assembly is now completed.

In the assembled state, projections 12 on the outer surface of sealing member 10 are elastically deformed and in sealing contact with the inner surface of cavity 2. Projections 13 on the surface of axial bore 11 are elastically deformed and are in sealing contact with the outer surface of insulation 4*a* of wire 4. This prevents water from entering cavity 2 through clearances between the outer surface of sealing member 10 and the inner surface of cavity 2 and between the surface of axial bore 11 and the outer surface of wire 4.

If a tensile force acts transversely (e.g. upward in FIG. 5) on wire 4, it is pressed upward against retainer 20. However, retainer 20 is rigid (not flexible) and does not move upward since it is secured within the inner surface of cavity 2. Accordingly, the part of wire 4 inwardly of retainer 20 is unaffected by the force, and sealing member 10 does not undergo any elastic deformation. Thus, the outer surface of sealing member 10 and the inner surface of cavity 2, and the surface of axial bore 11 and the outer surface of wire 4, maintain sealing contact with each other over their entire circumferences, thereby preventing entrance of water into cavity 2. Since sealing member 10 and retainer 20 are first unitarily coupled in assembling the sealing device, assembly thereafter is facilitated. It should be noted that coupling sealing member 10 and retainer 20 can be performed at any stage of the assembly.

Tapered surfaces 22*a* in engaging holes 22 of retainer 20 facilitate insertion of tapered surfaces 15*a* of locking portions 15 into and through engaging holes 22. Similarly, tapered surface 21*a* prevents insulation 4*a* of wire 4 from being torn or abraded when wire 4 is bent with respect to cavity 2, i.e. when an outside force causes wire 4 to be bent about the periphery of central bore 21.

Figure 6:
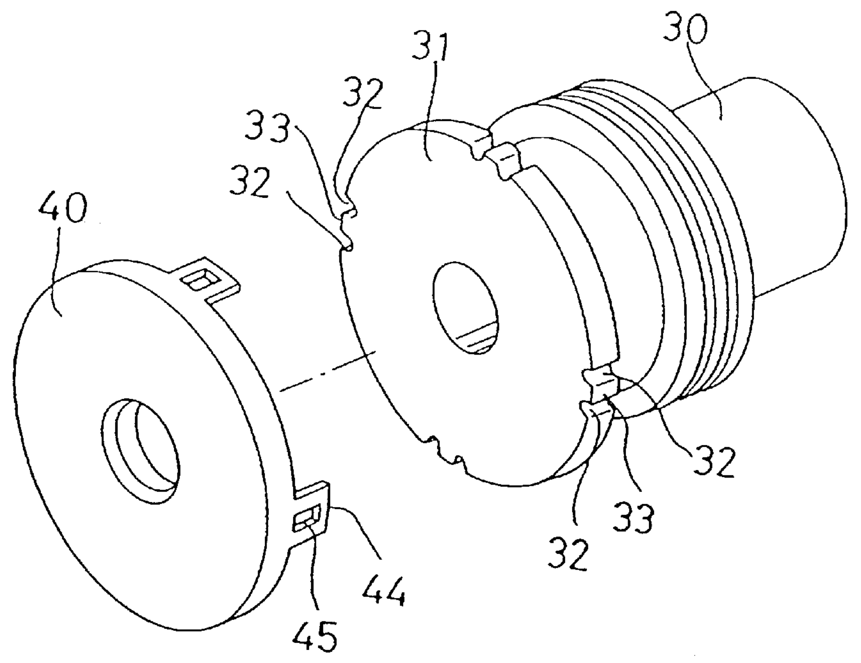
FIG. 6 is a perspective view, similar to FIG. 1, of a modification thereof.
Figure 7:
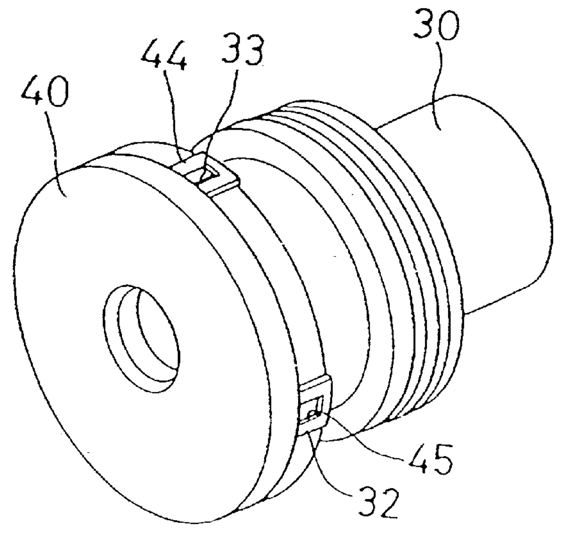
FIG. 7 is a perspective view, similar to FIG. 2, of the modification of FIG. 6.

The embodiment of FIGS. 6 and 7 differs in the coupling of sealing member 30 and the retainer 40. Since the rest of this embodiment is the same as the first embodiment, no description will be given therefor.

At the outer circumferential surface of attachment portion 31 at the rear of sealing member 30, four pairs of notches 32, 32, each pair spaced apart by a small distance, are circumferentially spaced apart by 90 degrees. Engaging projection 33 is defined between each pair of notches 32, 32. On the outer circumferential surface of retainer 40, four engaging portions 44 which include engaging holes 45 receive corresponding engaging projections 33 and project toward member 30.

When retainer 40 is pressed onto member 30, the two members are closely coupled, the side parts of engaging portions 44 fit into corresponding notches 32, 32, and the engaging projections 33 enter engaging holes 45. To accomplish this, engaging projections 33 and engaging portions 44 are deformed. In this way, sealing member 30 and retainer 40 are unitarily coupled.

Figure 8:
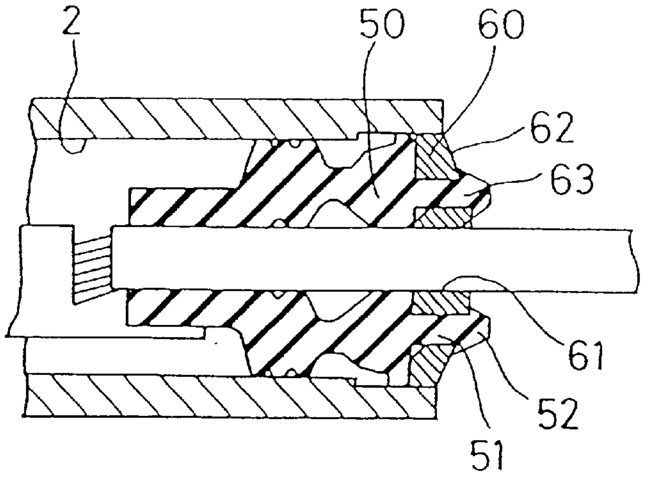
FIG. 8 is similar to FIG. 3 and shows a further modification of the Invention.

The device of FIG. 8 differs in the shape of retainer 60 and of engaging projections 51 of sealing member 10. Since the rest of the device is the same as the first embodiment, no description will be given therefor.

The rear side of retainer 60 is in the shape of an umbrella. The outer surface thereof forms tapered surface 62 slanting toward the outer periphery from central bore 61. Engaging projections 51 of the sealing member 50 conform to the thickness of retainer 60. Further, a stepped portion of each locking portion 52 is slanted so as to conform to the slope of tapered surface 62.

When retainer 60 is pressed against member 50 to seal these two members against each other, locking portions 52 are inserted through engaging holes 63 of retainer 60 while undergoing elastic deformation so that the diameters thereof decrease. When emerging from engaging holes 63, locking portions 52 retain their original shapes and lock at the edges of engaging holes 63, thereby securing engaging projections 51 in engaging holes 63. In this way, retainer 60 and sealing member 60 are unitarily coupled.

Even if the device is held so that the rear end of cavity 2 faces upward, water impinging thereon flows toward the outer periphery along tapered surface 62 and is discharged outside the opening edge of cavity 2. This eliminates the possibility that water on the outer surface of retainer 60 will enter cavity 2 through a gap between the outer surface of retainer 60 and the inner surface of cavity 2.

Figure 9:
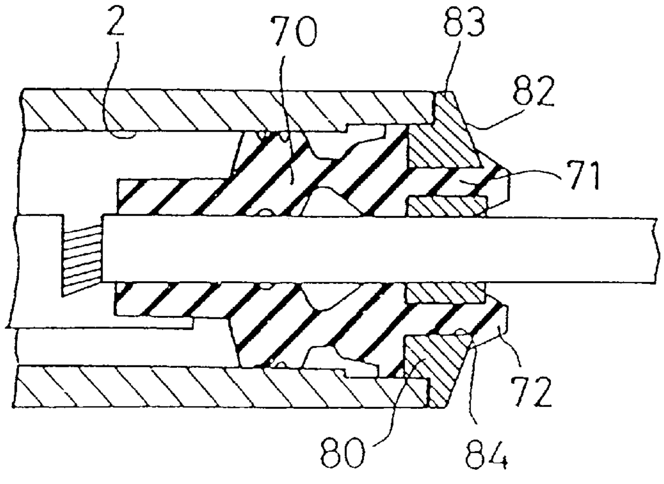
FIG. 9 is a section of a modification of FIG. 8.

The embodiment of FIG. 9 differs in the shapes of the retainer and the engaging projections of the sealing member. Retainer 80 has, in its entirety, a diameter which preferably corresponds to the outer diameter of the cavity. The outer surface of retainer 80 is tapered surface 82, the outer periphery of which projects outward from the rim of the cavity opening to define shoulder 83. Further, engaging projections 71 conform to the thickness of retainer 80.

When retainer 80 is pressed so that it is closely coupled to member 70, locking portions 72 are inserted through engaging holes 84 while undergoing elastic deformation such that the diameters thereof decrease. Consequently, engaging projections 71 are engaged by holes 84. In this way, sealing member 70 and retainer 80 are unitarily coupled.

Since shoulder 83 at the outer periphery of retainer 80 completely covers the opening of cavity 2, water flowing along the tapered surface 82 toward the outer periphery of retainer 80 is discharged radially beyond the rim of the opening. This prevents entrance of water into a gap between the outer surface of retainer 80 and the inner surface of cavity 2. Particularly in recent years, high pressure water is often sprayed on cars by automatic car washing machines. In such cases, the sprayed water is discharged along the tapered surface outside the rim of the cavity, thereby preventing entrance of water.

This aspect of the Invention is not limited to the foregoing illustrated and described embodiments, but such changes as would be apparent to the person of ordinary skill may be made while still remaining within its purview. For example, in the foregoing device, movement of the retainer relative to cavity 2 is prevented by unitarily coupling the retainer to the sealing member and adapting its diameter to that of the cavity. However, this may also be accomplished by locking the retainer with an engaging member formed on the inner surface or at the rim of the cavity, without it being coupled to the sealing member.

Figure 10:
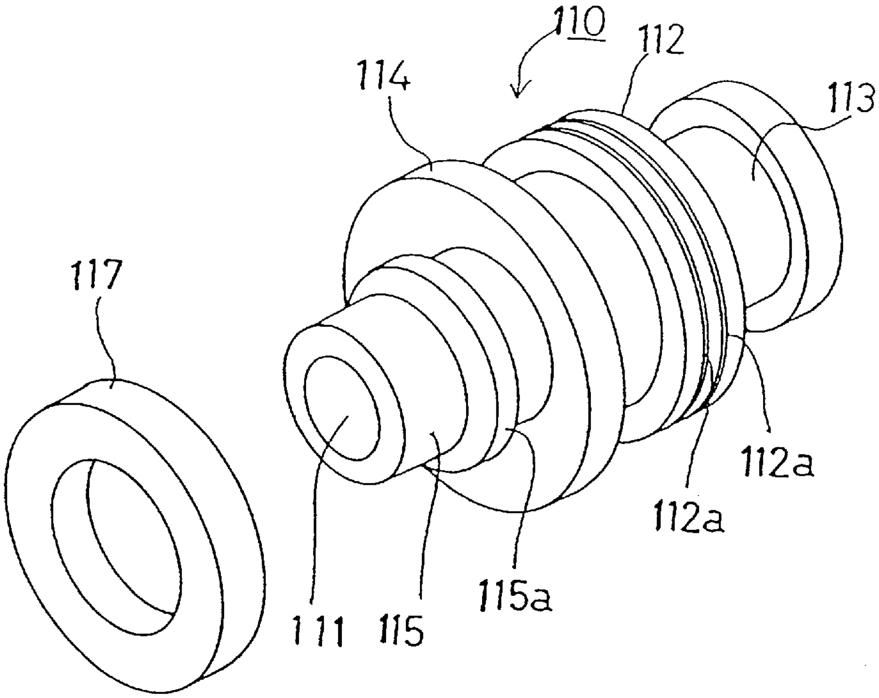
FIG. 10 is a perspective view of a sealing member according to another embodiment of the Invention.
Figure 11:
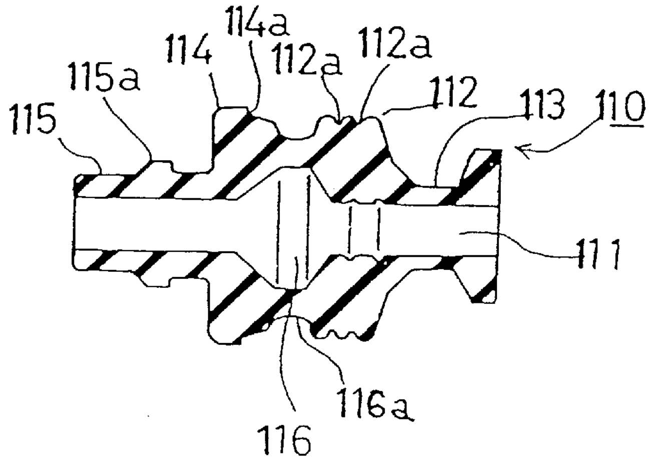
FIG. 11 is a section of the member of FIG. 10.
Figure 12:
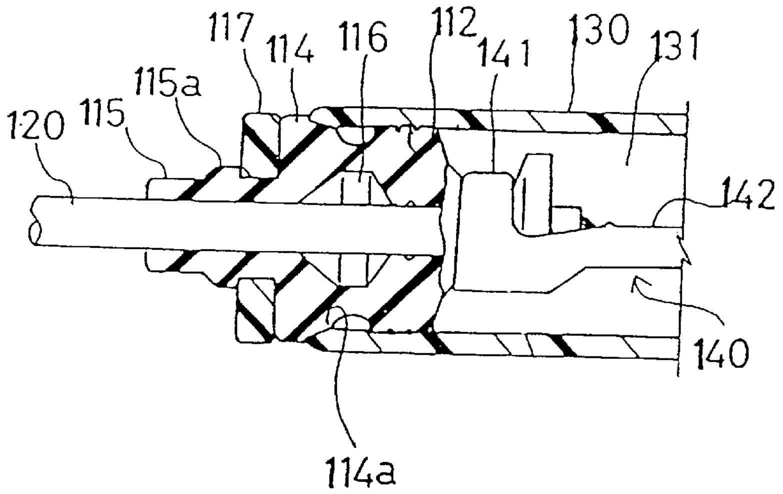
FIG. 12 is a section of the sealing member of FIG. 10 in its mounted position.

FIGS. 10 to 12 show a sealing device wherein cylindrical member 110 of elastic material (e.g., rubber) has axial bore 111 into which insulated wire 120 is inserted. A center portion of member 110 with respect to its longitudinal direction is base portion 112. On the outer circumferential surface of base portion 112, there are two annular grooves 112*a,* 112*a,* which define three ribs. The diameter of these ribs is larger than the inside diameter of cavity 131 in sealing device 130 for accommodating terminal fitting 140. Cavity 131 acts as a wire inserting portion.

Tube portion 113 having a smaller diameter is continuous and unitary with the front end of base portion 112. The diameter of tube portion 113 increases at the opposite end thereof. Flange portion 114, having a diameter larger than that of base portion 112 is continuous and unitary with the other end of base portion 112. Flange portion 114 has stepped portion 114*a* with a diameter substantially equal to that of base portion 112 at its side facing base portion 112. Locking sleeve 115 (forming a sleeve extension) having a smaller diameter similar to that of tube portion 113 is continuous and unitary with flange portion 114 and projects therefrom in a direction away from base portion 112. At an intermediate point on locking sleeve 115, annular projection 115*a* is provided and has a slanting surface at its side facing away from flange portion 114 and is spaced axially apart therefrom. The outside diameter of intermediate portion 116*a* between base portion 112 and flange portion 114 is slightly smaller. Additionally, the inside diameter thereof, i.e. the diameter of axial bore 111 at a point corresponding to intermediate portion 116*a,* is larger thereby forming hollow 116.

Ring member 117 of resin (or any other rigid material) has an inside diameter substantially equal to the outside diameter of locking sleeve 115, and an outside diameter substantially equal to that of flange portion 114. Further, the thickness of ring member 117 is substantially equal to the distance between projection 115*a* and flange portion 114. Terminal fitting 140 to be mounted in cavity 131 comprises insulation barrel 141, which cramps tube portion 113, and wire barrel 142, for cramping the core of insulated wire 120.

To assemble the device, ring member 117 is first mounted on locking sleeve 115 of member 110. As locking sleeve 115 is inserted through ring member 117, annular projection 115*a* comes into contact with ring member 117. When locking sleeve 115 is further pressed, projection 115*a* is deformed away from ring member 117 and resumes its shape when it emerges at the opposite side thereof. As a result, ring member 117 is retained between projection 115*a* and flange portion 114.

Next, wire 120 is inserted into through hole ill of sealing member 110 from the rear of locking sleeve 115 to tube portion 113. When wire 120 is completely inserted, insulation at the leading end is peeled off to expose the core. The wire and sealing member 110 are positioned so that the core is cramped by wire barrel 142 of the terminal fitting 140 and tube portion 113 of sealing member 110 is cramped by insulation barrel 142 at the same time. Insulation barrel 141 not only cramps tube portion 113 and the insulated part of wire 120, as shown in FIG. 12, but also lockingly retains wire 120 and sealing member 110. The leading end of tube portion 113, having a larger diameter, is located between insulation and wire barrels 141 and 142, and deformably projects radially outward therebetween. Thus, when a force acts to pull sealing member 110 out, the radially outwardly projecting leading end of tube portion 113 is caught by insulation barrel 141, thereby securely preventing sealing member 110 from being withdrawn from cavity 131.

Thereafter, terminal fitting 140 is inserted into cavity 131 of sealing device 130. When terminal 140 is completely mounted, insertion of base portion 112 of sealing member 110 into cavity 131 is started. Since the diameter of base portion 112 is larger than the inside diameter of cavity 131, base portion 112 is compressively deformed radially inwardly of cavity 131; it is inserted and comes into tight contact with the inner wall of cavity 131. Sealing member 110 is pressed into cavity 131 until stepped portion 114*a* of flange portion 114 contacts the outer edge of cavity 131. This is shown in FIG. 12.

If high pressure water is sprayed toward the opening of cavity 131, it will strike ring member 117, thereby pressing it against one surface (wall) of flange portion 114. Since the other surface of portion 114 is in contact with the rim of cavity 131, flange portion 114 is tightly held between ring member 117 and the rim of cavity 131. This brings flange portion 114 into closer contact with the rim, thereby improving the waterproof seal.

Ring member 117 may, according to the Invention, be omitted. In that case, a jet of water sprayed onto the outer surface of flange portion 114 presses this portion 114 into closer contact with the rim of the cavity opening. It is an important feature that the outer diameter of flange portion 114 is larger than the inner diameter of cavity 131, and permits portion 114 to lap over cavity 131, thereby improving the sealing performance even in the absence of ring member 117.

However, ring member 117, when provided, has an additional advantage of preventing water from entering cavity 131 between member 110 and wire 120. If water is sprayed in direction of cavity 131, it may, in the absence of ring 117, enter the cavity between the sealing member and the wire.

If ring member 117 is provided on locking sleeve 115, water entering the gap between locking sleeve 115 and wire 120, is blocked thereby, i.e. ring member 117 prevents locking sleeve 115 of elastic material from flexing radially and thus prevents a gap from being formed between locking sleeve 115 and wire 120. It will be appreciated that the combination of locking sleeve 115 and ring member 117 may be advantageously provided even without the flange portion 114 projecting out of cavity 131.

If wire 120 is pulled, pushed, or bent in a transverse direction, flange portion 114 tends to deform in the same direction because of the presence of locking sleeve 115.

However, deformation thereof is not transmitted to base portion 112. Any movements of wall 14 are absorbed by the thin wall (intermediate portion 116*a*) defining hollow 116 between portion 114 and base portion 112, so that the latter is not deformed.

Figure 13:
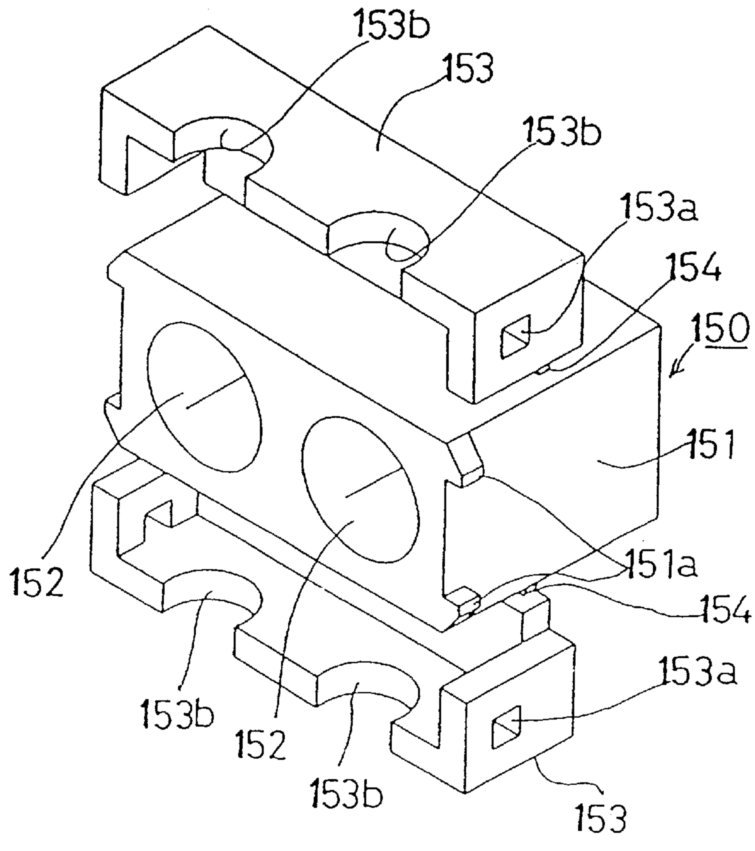
FIG. 13 is a perspective view of a contact member according to another embodiment of the Invention.
Figure 14:
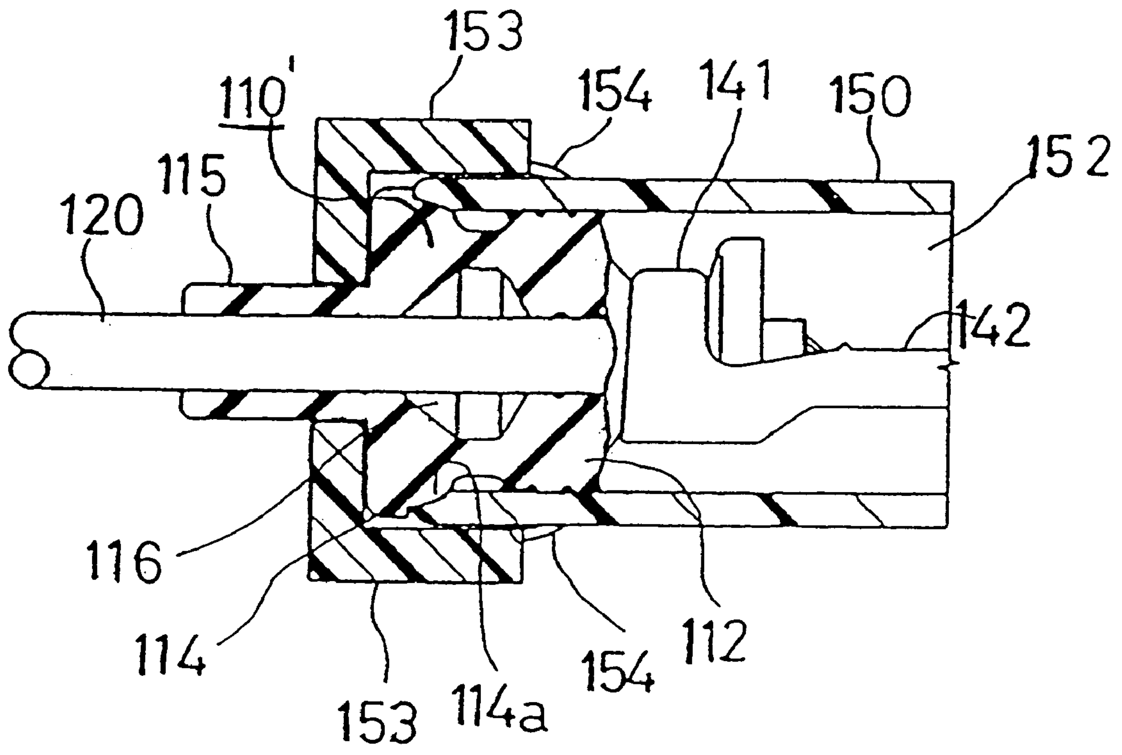
FIG. 14 is a section of the sealing member of FIG. 13.
Figure 15:
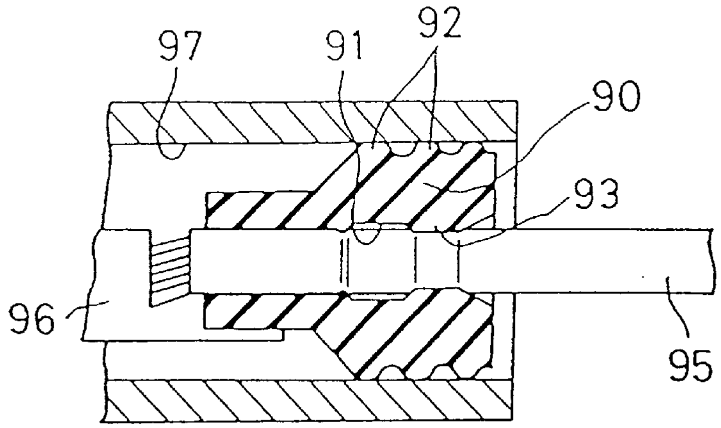
FIG. 15 PRIOR ART
FIG. 15 is a section of a prior art sealing member in its assembled state.
Figure 16:
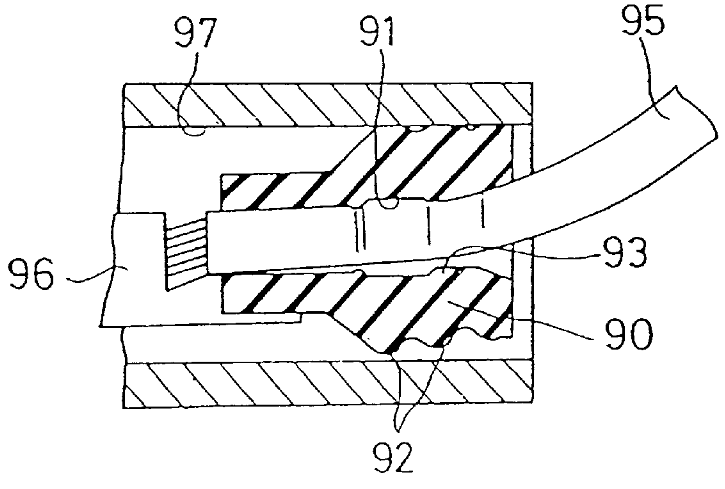
FIG. 16 PRIOR ART
FIG. 16 is a section of the prior art sealing member of FIG. 15 showing the effect of a force acting on the wire in a transverse direction.
Figure 17:
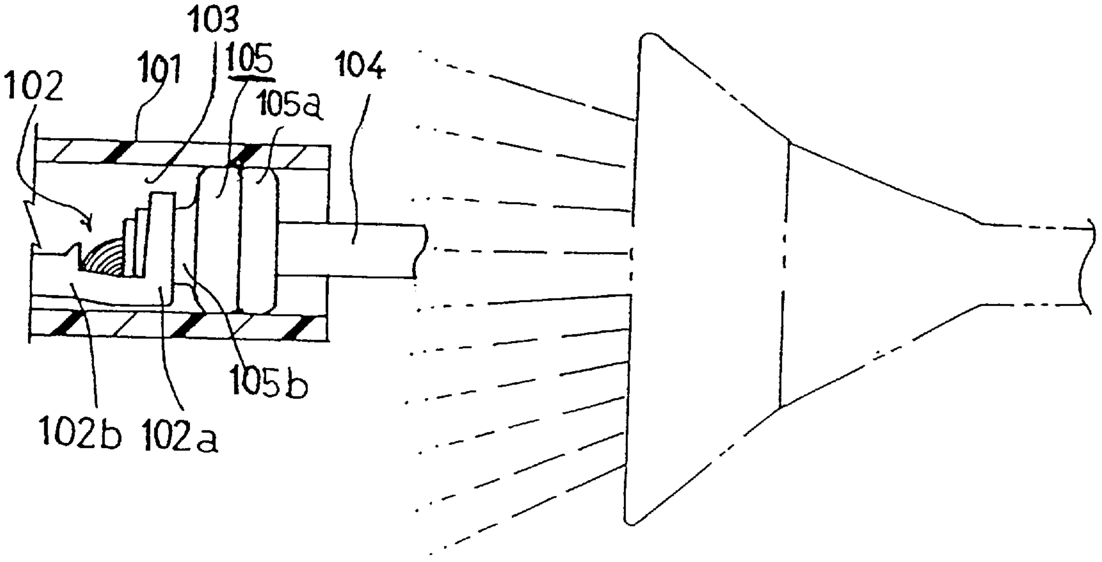
FIG. 17 PRIOR ART
FIG. 17 is a section of another prior art sealing member in its mounted position.

In FIGS. 13 and 14, ring member 117 is a contact member mounted at the rear of sealing member 110. However, in this embodiment, a cover mountable on the housing is used as a contact member.

Sealing device 150 includes rectangular body 151 having two terminal fitting cavities 152, 152 side by side. Covers 153, 153 are mounted on the upper and lower surfaces of body 151 to close the openings of cavities 152, 152. Covers 153 are unitarily formed of resin with body 151 and connected thereto by thin hinge plates 154. Covers 153 are each so formed as to cover parts of the upper, rear, and side surfaces of body 151. Covers 153 are provided with locking holes 153*a* and body 151 carries, at its lateral side surfaces, locking projections 151*a* which engage locking holes 153*a*. In parts of covers 153, 153 corresponding to cavities 152, 152, there are semi-circular holes 153*b*. When covers 153 close the openings of cavities 152, 152, each pair of vertically opposed semicircular holes 153*b* form a circular hole. Sealing member 110' is provided with neither resin ring member 117 nor projection 115*a* for retaining ring member 117.

To assemble the device, insulated wires 120 are inserted into sealing members 110 and are cramped by terminal fittings 140. They are then inserted into cavities 152, 152 with terminal fittings 140 leading. Upon inserting members 110' into cavities 152, 152 to stepped portions 114*a,* covers 153, 153 are closed. Covers 153, 153, in their closed positions, cover the entire rear surfaces of flange portions 114 as shown in FIG. 14, and locking sleeves 115 and wires 120 project outward from the circular holes.

If high pressure water is sprayed at this device, it presses covers 153 against the flange portions 114, thereby forcing them against the rim of cavities 152 and increasing the sealing contact, thus preventing the entrance of water. Since sealing member 110' is not provided with ring member 117, it can be mounted in the same manner as prior art members. Further, since covers 153 press against flange portions 114 while being coupled to connector 150, they are thereby locked in place.

Although a resin ring member and covers are used as contact members in the foregoing embodiments, the contact member is not limited to these. It may take other shapes which will cover the rear surface of the flange portion. For example, the contact member may be a cap-like member which covers the terminal fitting cavity. If there is a plurality of terminal fitting cavities, it is also possible to use unitary sealing members having corresponding flange portions. With such sealing members, efficiency will increase because the terminal fittings are connected into one piece.

While only a limited number of specific embodiments of the present Invention have been expressly disclosed, it is, nonetheless, to be broadly construed and not to be limited except by the character of the claims appended hereto.

What we claim is:

1. A sealing device for a cavity defined by a peripheral wall of a waterproof connector housing, said sealing device adapted to receive an electric wire which is at least partly in said cavity, said device comprising an elastic sealing member in said cavity and having an outer surface in sealing contact with an inner surface of said peripheral wall of said cavity, thereby preventing entry of liquid into said cavity, a rigid retainer, in engagement with said sealing member and at least partly in said cavity in contact with said inner surface, said rigid retainer having an outer face, said outer face being slanted from a center of said outer face to an outer periphery of said waterproof connector housing, whereby liquid impinging on said outer face is directed toward said peripheral wall away from said cavity, at least one locking projection on said elastic sealing member, said locking projection extending outwardly of said cavity and having an enlarged portion at its end remote from said sealing member, at least one retainer hole through said retainer, complementary to said locking projection with a cross-section smaller than said enlarged portion, whereby said retainer can be pressed thereover and retained on said locking projection, so that, when said electric wire is bent transversely to its longitudinal axis, deformation of said sealing member is substantially prevented.

2. The sealing device of claim 1 wherein an inner surface of said sealing member sealingly contacts an outer surface of said electric wire.

3. The sealing device of claim 1 wherein said electric wire comprise a conductive core surrounded by insulation.

4. The sealing device of claim 3 wherein said sealing member has an axial bore through which said wire extends.

5. The sealing device of claim 4 wherein said rigid retainer has a central bore in register with said axial bore through which said wire extends.

6. The sealing device of claim 5 wherein said central bore is beveled outwardly in an outward direction away from said sealing member, whereby damage to said wire, when said wire is bent, is reduced.

7. The sealing device of claim 1 wherein there are two said locking projections, with a central bore therebetween.

8. The sealing device of claim 1 wherein said enlarged portion tapers in a direction outwardly of said cavity, thereby facilitating pressing said retainer thereover.

9. The sealing device of claim 1 wherein said retainer hole tapers away from said outer end.

10. The sealing device of claim 1 wherein said retainer is within said cavity.

11. The sealing device of claim 1 wherein said cavity has an enlarged diameter adapted to receive said retainer.

* * * * *